(12) United States Patent
Nallasivam

(10) Patent No.: US 8,347,271 B1
(45) Date of Patent: Jan. 1, 2013

(54) SOFTWARE TESTING

(75) Inventor: Subramanian Nallasivam, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 1295 days.

(21) Appl. No.: 11/714,715

(22) Filed: Mar. 5, 2007

(51) Int. Cl.
*G06F 9/44* (2006.01)
(52) U.S. Cl. ........................... 717/132; 717/135
(58) Field of Classification Search ........... 717/124–135
See application file for complete search history.

(56) References Cited

U.S. PATENT DOCUMENTS

2005/0223361 A1* 10/2005 Belbute ..................... 717/124

OTHER PUBLICATIONS

D.A. Stacey, "Software Testing Techniques", Nov. 2005, retrieved from http://web.archive.org/web/20051122010245/http://hebb.cis.uoguelph.ca/~dave/343/Lectures/testing.html , 6 pages.*

"Software Testing Techniques", Oct. 2004, retrieved from Waybackmachine via http://www.his.sunderland.ac.uk/~cs0mel/comm83wk5.doc , pp. 1-22.*
Laurie Williams, "White-Box Testing", 2006, retrieved from http://agile.csc.ncsu.edu/SEMaterials/WhiteBox.pdf, pp. 60-74.*
Watson et al., "Structured Testing: A Testing Methodology Using the Cyclomatic Complexity Metric", Sep. 1996, McCabe Software, www.mccabe.com, pp. i-x, 1-113.*
Prather, "Theory of Program Testing—An Overview", Dec. 1983, The Bell System Technical Journal, pp. 3073-3105.*

* cited by examiner

*Primary Examiner* — Ted T Vo
(74) *Attorney, Agent, or Firm* — Van Pelt, Yi & James LLP

(57) ABSTRACT

Defining a software test is disclosed. A benchmark complexity for a test case including at least one test step having a check condition and a functionality is defined. The test case is represented as a flow graph in which the check condition of each test step of the test case is represented as an edge of the flow graph and the functionality of each test step is represented as a vertex in the flow graph. A test case complexity is determined by determining a number of independent paths in the flow graph. If the test case complexity as determined based on the number of independent paths exceeds the benchmark complexity, the number of test steps in the test case is reduced.

22 Claims, 5 Drawing Sheets

SOFTWARE TESTING

BACKGROUND OF THE INVENTION

In software engineering, testing is often performed to ensure software functionality. To test the software requirements, test cases, conditions, or variables are created to determine if the requirements are satisfied. Many test cases may be needed to determine if a particular requirement is fully satisfied.

A problem with this software testing is that there can be a large number of errors in an application. During testing, a fault may occur due to a programming error. However, in such cases, it may not be known which part of the code caused the error. Other times, it may be difficult to determine what portion of the test case triggered the error.

In order to identify and fix the bug, the test steps are repeated to duplicate the error. However, bugs that occur infrequently may be difficult to find in testing and it may not be possible to troubleshoot errors that cannot be reproduced. Sometimes, this can be because the size of the test can vary with the number of test steps within a test case. As such, there is no limit to the number of test steps within a particular test case. Further, in product testing, there may be more than one engineer performing the testing and this may lead to duplication of testing as each engineer can check a single code path multiple times.

The traditional way of testing is to execute test cases that are written according to a test strategy, test design specification, or the software documentation. The tester writing the test cases typically does not apply any standardized procedure while developing the test cases. There is no standard limit maintained as to how many test steps should be within a test case. Therefore, there can be any number of test steps written for a particular test case. Moreover, a tester may write test cases without knowing the complexity or paths involved in those test steps. Also, the complication or difficulty involved in organizing the test setup for executing the test steps may not be known to the tester while writing the test steps.

The greater the number of test steps within the test case, the more complex it is to execute the test steps. Overly complex test cases are more prone to error and are harder to execute. Also, the time to complete a test case increases as the number of test steps within the test case increases. This leads to test cases varying in execution time. Thus, it is difficult to estimate the execution time of the test cases. Therefore, there is a need for a way to develop test cases that are effective but not overly complicated.

BRIEF DESCRIPTION OF THE DRAWINGS

Various embodiments of the invention are disclosed in the following detailed description and the accompanying drawings.

DETAILED DESCRIPTION

Figure 1:
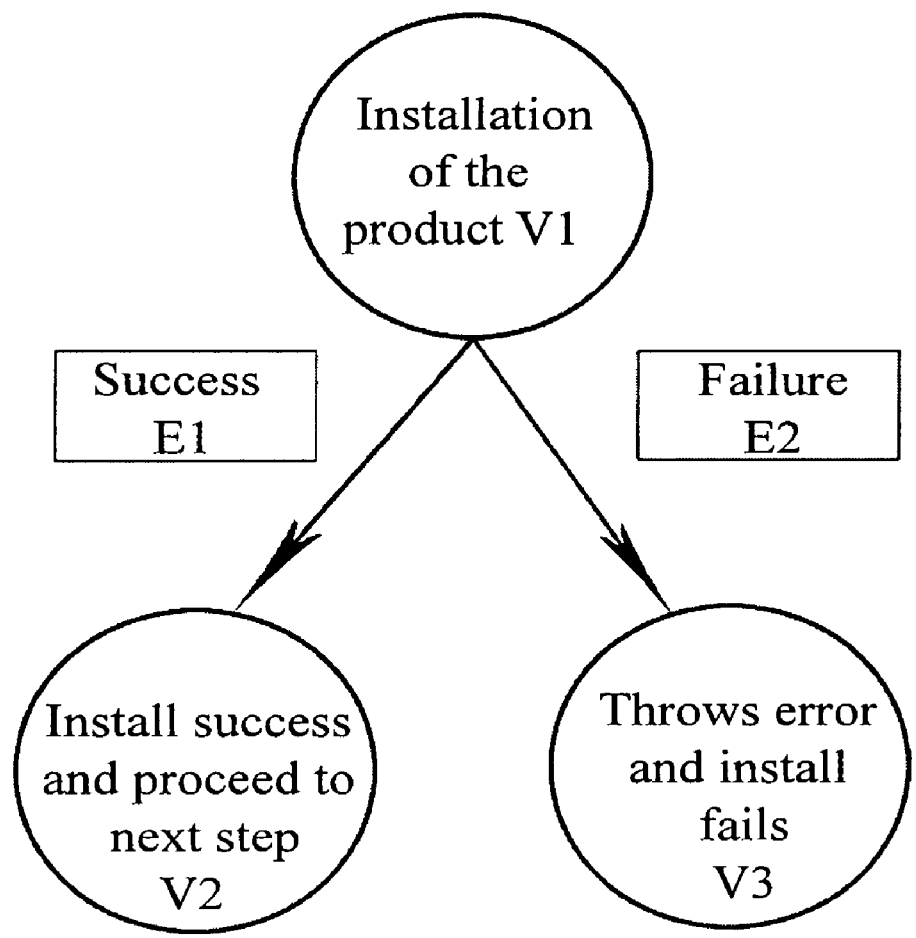
FIG. 1 shows a flow graph representation of an exemplary test case, according to some embodiments.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A procedure for writing test cases used for testing of software is disclosed. In some embodiments, standard test cases with an optimum number of test-steps are written. A bench mark for complexity of the test cases is set. The full functionality of the test case is represented in a flow graph. The check conditions of each test step within the test case are represented as edges and the functionality of each test step is represented as vertices in the flow graph. The number of independent paths is determined from the flow graph to find the complexity of the test case under study. The number of test steps in the test case under study is reduced if the complexity of the test case exceeds the bench mark. The steps outlined above are repeated iteratively, if needed, until the complexity of test case is equal to or less than the bench mark.

In some embodiments, graph theory is used to determine the number of independent paths for a test case. A test case is the representation of a particular function and each function can be represented as a flow graph. In this way, the complexity of a test case may be derived from the number of independent paths in the flow graph.

For a given test case, a test step is defined as a step or set of steps having a pass condition and a fail condition. The pass/fail condition can be represented as edges in a flow graph while each function in a test step can be represented as a vertex. The flow graph is used to determine the number of independent paths in the test case. There will be no cycle created in the flow graph, as the testing of a particular test case stops once a failure is arrived at.

Since all the test steps of a test case can be represented in a flow graph, the different paths between the vertices, to be traversed or tested, are known. Then, when a particular path is traversed and an error occurs, it is easy to identify the path or the test step which created the problem. This avoids duplication of test steps in various test cases.

In some embodiments, if the whole functionality is represented in the flow graph, then it can be helpful to calculate the percentage of the functionality covered in each component of a test case. For example, if a particular functionality of a test case is represented in the flow graph and testing of this case has been completed, then the percentage completed of the overall functionality testing is also known.

Using the graphical method, the full functionality of a test case can be represented in a flow graph, where every step is represented as a binary tree. This representation facilitates understanding the flow paths and, in particular, what paths have been covered by the tester. With the flow paths, it can be known exactly what has been tested and what areas have been covered. This method avoids duplication of defects in a test scenario, as both the path and the end result are known. Also, since the path is identified along with the functions that have been completed, one can easily follow the path at any given point of time to determine the steps involved. This allows reproduction of defects that occurred during testing to facilitate fixing the defects.

In the description that follows different embodiments of the invention have been described with reference to the illustrative drawings. Definitions of the various terms that are used in the specification are given below:

Diameter of Flow graph=max $\{d (u, v)$ such that $u, v$ belongs to $V(G)\}$,
where $V(G)$ refers to the set of vertices in a flow graph.
If G has a path from u to v, then the distance from u to v, written as $d(u,v)$, is the least length of such a path.
Independent set: There should be no edge between any two vertices in the set. In other words, a set of vertices in graph theory is said to be an independent set if there exists no edge between any two vertices in that set.
The independence number of a flow graph is the maximum size of an independent set of vertices.
Degree: Number of edges passing through a vertex.
Predicate node: A Binary decision predicate appearing on the flow graph as a node with exactly two edges flowing out of it.
Pendent vertices: Vertices of degree 1 on the flow graph.
Cardinality: Number of elements in a set.

The following examples illustrate determining the number of independent paths and consequently arriving at the complexity of a test case in some embodiments. Once the complexity of a test case is defined, the number of test steps within the test case can be restricted or standardized. The following examples are intended to illustrate but not limit the scope of the invention.

EXAMPLE 1

A test case for installing a product may be represented as shown in FIG. 1. The expected results depend on the check conditions or the Pass/Fail condition, which are defined as follows: the product was installed without any error and proper binaries should be in place as expected—Pass condition; or the product is not installed because of errors—Fail condition.

The flow graph in FIG. 1 describes the logic structure of the test module. The flow graph consists of nodes (vertices, e.g., V1, V2, and V3) and edges (e.g., E1, E2), where the nodes represent test steps, and the edges represent transfer of control between them.

There may be several ways for determining the number of independent paths included in a test case. In various embodiments, one or more of the following four methods (i)-(iv) for determining the number of independent paths are used:

i) The number of vertices of degree 1 in a flow graph provides the number of independent paths in the flow graph. The vertices of degree 1 in the example shown in FIG. 1 are V2 and V3. Accordingly, the number of independent paths for the flow graph is 2.

ii) The number of independent paths of a test step can be calculated using the formula $E-N+2$, where E is the number of edges in the flow graph and N is the number of vertices of degree 1 (Pendent vertices). In the example shown in FIG. 1, for a path the maximum number of edges passing through a vertex in the flow graph is two. So '+2' has been added to the above equation. Accordingly, the number of independent paths may be determined from the flow graph of FIG. 1, as follows: Number of edges, E, is 2 (i.e. E1 and E2), minus the number of nodes of degree 1, N, =2 (i.e. V2 and V3), plus 2=2.

iii) For the flow graph of FIG. 1, the diameter can be calculated as Diameter G=max $\{d(V1, V2), d(V1, V3), d(V2, V3)\}$=max $\{1, 1, 2\}$=2. The result shows that there are two independent paths.

iv) For the flow graph of FIG. 1, the maximum cardinality (that is the maximum number of elements) of the independent set is 2 [$\{V2, V3\}$].

EXAMPLE 2

The test case is developed for installing the product and configuring the functionality of the component. The test case will have the following test steps: (1) Install the product; and (2) Label and mount the file type device.

The expected results may be defined depending on the Check conditions or the Pass/Fail condition of each respective test step. In the example shown in FIG. 2, the expected results of the installation step (V1) are: the product is installed without errors—Pass condition (E1); and the device is mounted without errors—Pass condition (E3).

Figure 2:
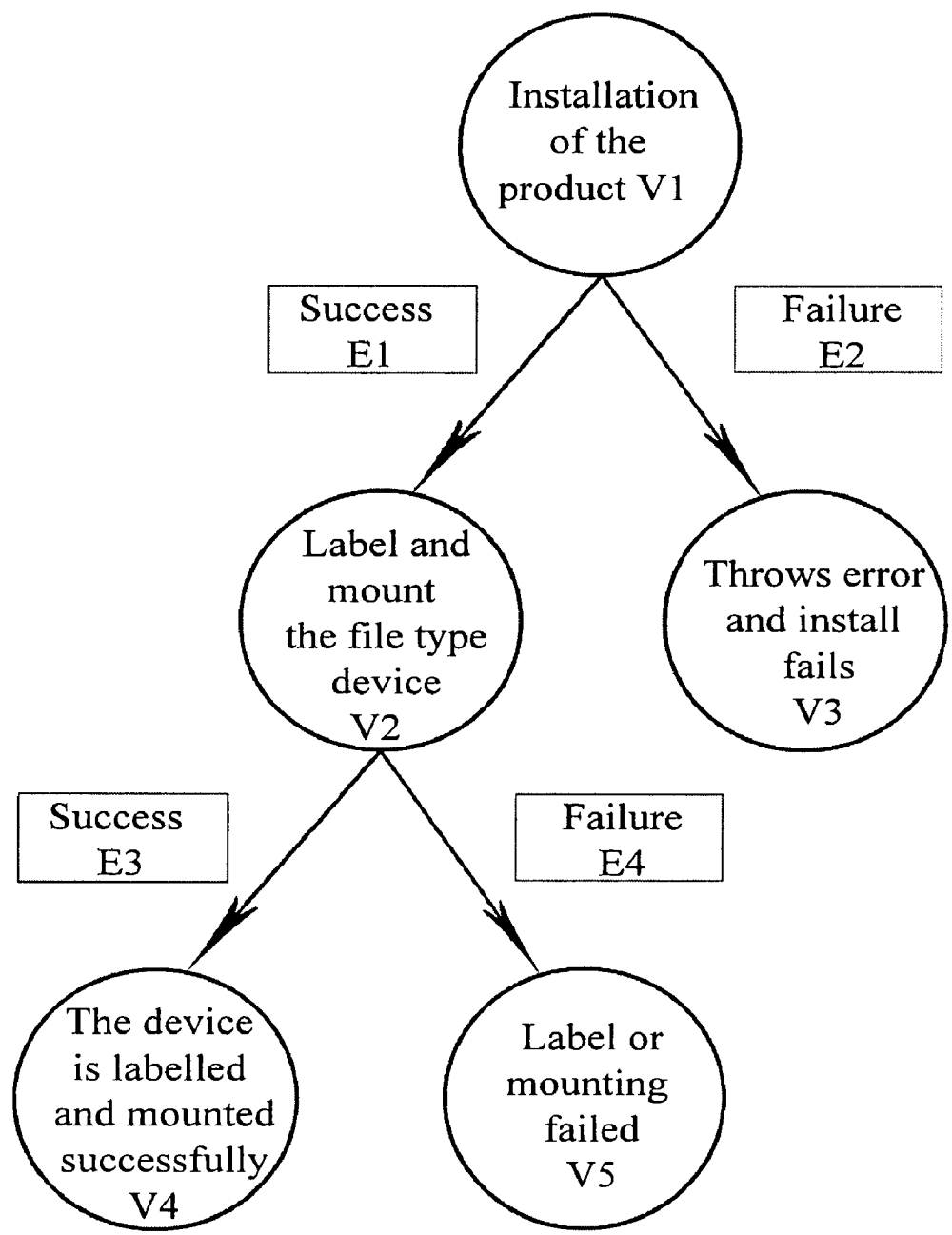
FIG. 2 shows a flow graph representation of an exemplary test case, according to some embodiments.

The number of independent paths determined for Example 2 is described below:

i) The vertices of degree 1 as obtained from the flow graph of FIG. 2, are V3, V4 and V5. Accordingly, the number of Independent paths for the said flow graph is 3.

ii) Applying the formula $[E-N+2]$, from the flow graph, it is seen that the number of edges (E) in the flow graph is 4 (i.e. E1, E2, E3 and E4) and the number of vertices of degree 1 (N) is 3 (i.e. V4, V5 and V3). Applying the values for E and N in the formula $[E-N+2]$ gives the number of independent paths $4-3+2=3$.

iii) For the flow graph of FIG. 2, the diameter can be calculated as follows: Diameter G=max $\{d(V1, V2), d(V1, V3), d(V1, V4), d(V1, V5), d(V2, V3), d(V2, V4), d(V2, V5), d(V3, V4), d(V3, V5), d(V4, V5)\}$=max $\{1, 1, 2, 2, 2, 1, 1, 3, 3, 2\}$=3=number of independent paths.

iv) For the flow graph of FIG. 2, the maximum cardinality of the independent set is 3 [$\{V4, V5, V3\}$].

EXAMPLE 3

The test case is developed for installing the product, mounting the file type device and performing backup of the directory. The test case will have the following test steps: Install the product; label and mount the file type device; and perform the backup of the directory. The check conditions or the Pass conditions of the test steps are as follows: The product is installed without errors—Pass condition; the device is mounted without errors—Pass condition; and the backup of the directory is performed without errors—Pass condition.

Figure 3:
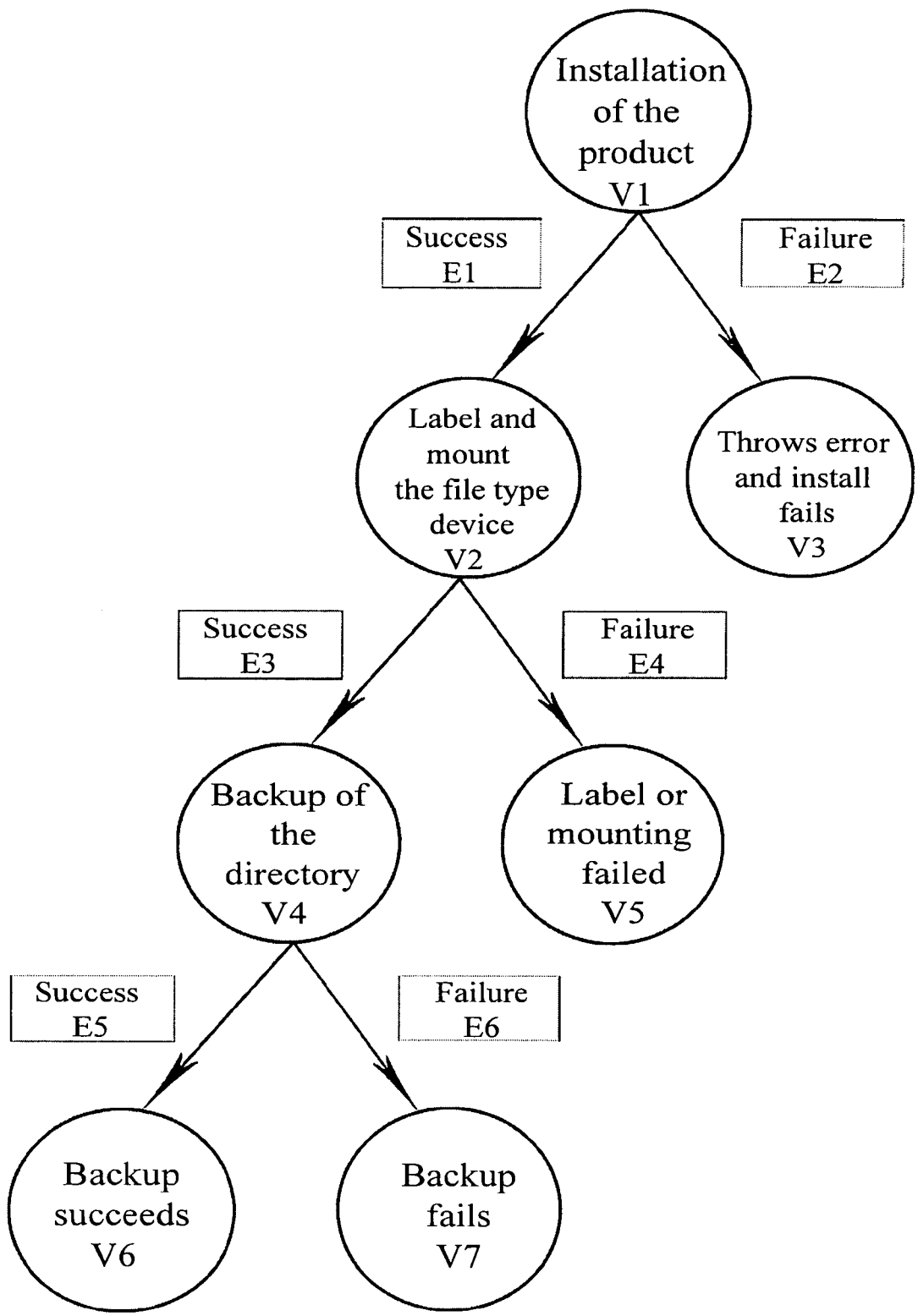
FIG. 3 shows a flow graph representation of an exemplary test case, according to some embodiments.

The above check conditions of the successful execution of the different test steps of the test case are illustrated in the flow graph of FIG. 3.

The number of independent Paths determined for the exemplary test case is determined as follows:

i) The vertices of degree 1 in the flow graph of FIG. 3 are V3, V5, V6 and V7. This gives the number of Independent Paths as 4.

ii) Applying the formula [E−N+2] gives the following result: The number of edges (E) in the flow graph of FIG. 3 is 6 (i.e. E1, E2, E3, E4, E5 and E6) and the number of vertices of degree 1 (N) is 4 (V3, V5, V6 and V7), and inserting these values for E and N in the formula [E−N+2]=>6-4+2=4. Accordingly, the number of Independent Paths is 4.

iii) For the flow graph of FIG. 3, the diameter can be calculated as follows: Diameter G=max {d(V1, V2), d(V1, V3), d(V1, V4), d(V1, V5), d(V1, V6), d(V1, V7), d(V2, V3), d(V2, V4), d(V2, V5), d(V2, V6), d(V2, V7), d(V3, V4), d(V3, V5), d(V3, V6), d(V3, V7), d(V4, V5), d(V4, V6), d(V4, V7), d(V5, V6), d(V5, V7), d(V6, V7)}=max {1, 1, 2, 2, 3, 3, 2, 1, 1, 2, 2, 3, 3, 4, 4, 2, 1, 1, 3, 3, 2}=4. Therefore, the Diameter G=number of independent paths=4.

iv) For the flow graph of FIG. 3, the maximum cardinality of the independent set is 4 [{V6, V7, V5 and V3}].

EXAMPLE 4

The test case is developed for installing the product, labeling and mounting the file type device, performing backup of the directory and recover the backed up files. The test case will have the following test steps: Install the product; label and mount the file type device; perform the backup of the directory; and recover the backed up files. The Pass conditions of the test steps are as follows: the product is installed without errors—Pass condition; the device is mounted without errors—Pass condition; the backup of the directory is performed without errors—Pass condition; and the backed up files are recovered without errors—Pass condition. The above pass conditions of each of the test steps of the test case are shown in the flow graph of FIG. 4.

Figure 4:
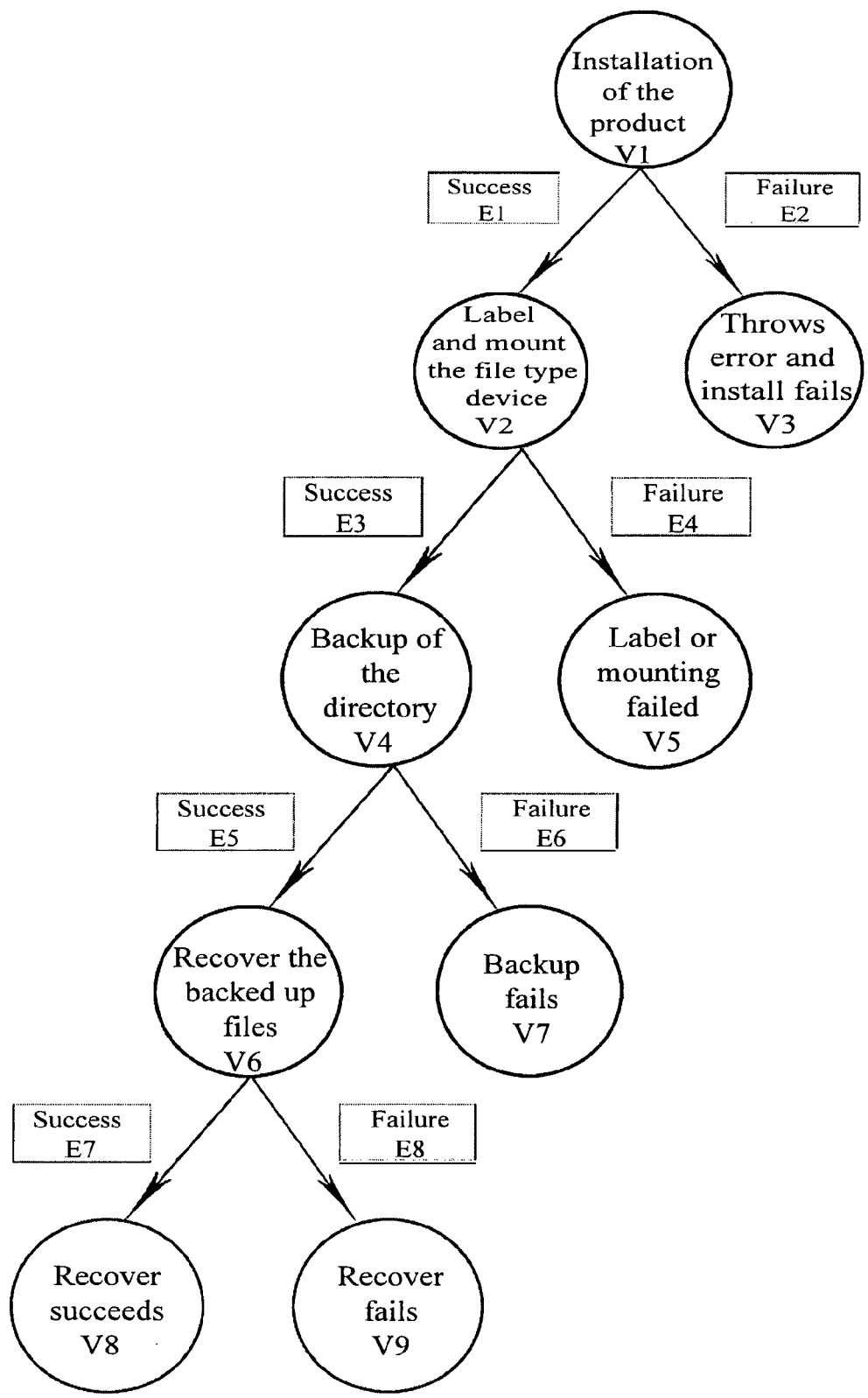
FIG. 4 shows a flow graph representation of an exemplary test case, according to some embodiments.

The number of independent path determined for the test case of Example 4 is described below.

i) From the flow graph of FIG. 4, vertices of degree 1 can be found as V3, V5, V7, V8 and V9. This gives the number of independent paths as 5.

ii) Applying the formula [E−N+2]: the number of edges (E) in the flow graph (FIG. 4) is 8 (E1, E2, E3, E4, E5, E6, E7 and E8), and the number of vertices of degree 1 (N) is 5 (V3, V5, V7, V8 and V9). Substituting the above values for E and N in the equation [E−N+2]=>8-5+2=5, indicating that the number of independent paths is 5.

iii) From the flow graph shown in FIG. 4, the diameter can be calculated as follows: Diameter G=max {d(V1, V2), d(V1, V3), d(V1, V4), d(V1, V5), d(V1, V6), d(V1, V7), d(V1, V8), d(V1, V9), d(V2, V3), d(V2, V4), d(V2, V5), d(V2, V6), d(V2, V7), d(V2, V8), d(V2, V9), d(V3, V4), d(V3, V5), d(V3, V6), d(V3, V7), d(V3, V8), d(V3, V9), d(V4, V5), d(V4, V6), d(V4, V7), d(V4, V8), d(V4, V9), d(V5, V6), d(V5, V7), d(V5, V8), d(V5, V9), d(V6, V7), d(V6, V8), d(V6, V9), d(V7, V8), d(V7, V9), d(V8, V9)}=max {1, 1, 2, 2, 3, 3, 4, 4, 2, 1, 1, 2, 2, 3, 3, 3, 3, 4, 4, 5, 5, 2, 1, 1, 2, 2, 3, 3, 4, 4, 2, 1, 1, 3, 3, 2}=5, indicating that the number of independent paths=5.

iv) For the flow graph of FIG. 4, the maximum cardinality of the independent set is 5 [{V9, V8, V7, V5 and V3}].

The number of independent paths, which are derived in various embodiments from one or more of the above methods, provide the complexity of the test case. The number of independent paths obtained from the flow graph representation of a test case is directly proportional to the complexity of that test case.

It may be assumed that complexity of a test case is derived from the formula E−N+2, that is Complexity=E−N+2, where E is the number of edges in a flow graph and N is the number of vertices of degree 1. The above assumption can be proved by induction hypothesis. This method of mathematical induction has been employed to mathematically establish that a given statement is true for all natural numbers. In induction hypothesis, if it is assumed that a statement is true for n=m, then the assumption is used to prove that the statement is also true for n=m+1. Thus, the method works by first proving the statement is true for a starting value, and then proving that the process used to go from one value to the next is valid.

Once the complexity of the test case is arrived at, one can standardize the number of test steps in the test case, knowing that the test case should not exceed beyond a certain complexity. In other words, the size of the test case can be limited.

The size of the test case can be managed if the complexity of the test case is known. Size of test case is directly proportional to the number of test steps within the test case. It can also be determined from the number of predicate nodes in the flow graph illustration of the test case.

For the flow graph of FIG. 1, size of the test case=1 (as the number of predicate node in the flow graph is 1 and that is the vertex V1). For the flow graph of FIG. 2, size of the test case=2 (as the number of predicate node in the flow graph is 2 and those are vertices V1 and V2). For the flow graph of FIG. 3, size of the test case=3 (as the number of predicate node in the flow graph is 3 and those are vertices V1, V2 and V4). For the flow graph of FIG. 4, size of the test case=4 (as the number of predicate node in the flow graph is 4 and those are vertices V1, V2, V4 and V6).

While the invention has been described using specific example flow graphs, those skilled in the art will appreciate that the present technique can be extended to other flow graphs and the size of the test case can be easily determined. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

An advantage of the tester determining the size of a test case is that the tester defines the boundaries of the testing. At present, there are no boundaries set for testers to limit the number of test steps in a test case. Using the method according to one of the aforementioned embodiments, if the complexity of the test case is determined, the test cases can be standardized to not exceed the estimated complexity.

An advantage in determining the number of independent paths helps to identify the number of test steps for a test case, which are available for the functional and non-functional testing. Once the number of test cases is identified and if all those test cases are of complexity 3 or 4, this helps to estimate the time for testing those test cases. Also, it avoids repetition of the same steps since the number of independent path is known.

The advantage in determining the maximum number of test steps for testing cases is that the number of test steps in a test case can be standardized. If the complexity of a test case is very high, it becomes difficult for the tester to execute the entire test steps and this tends to increase the time of testing for a particular test case. To avoid this condition, if before writing the test case, the writer has a complexity limit set and the tester can then devise test cases limiting the complexity of the test cases to be within the complexity limit.

The method according to an embodiment represents the test cases as directed flow graphs. The calculation of the number of independent paths depends upon the vertices and edges in the flow graph. Significantly, no loops are formed in writing the test cases unlike the software code such as in conditional statements like 'for', 'while' and the 'if' statement. Also, whenever a test case fails, further execution of that test case is stopped and another test case is executed. So, there is no imaginary path which leads to the root node of the test case which is represented in the flow graph. Each test step is represented by the decision node which leads to a pass or fail condition, and depending upon the decision, the process proceeds further without returning to the upper or root node at any time. Each step within the test case is executed once, where if the test step succeeds, the process traverses to the next step, and if it fails, the process stops at that point. Once the failure occurs, the execution of a test case is stopped and the next test case is executed.

By standard means, one can determine the running time of the algorithm. If a tester tries to represent every test step of a test case in a graphical mode, the setup time involved in executing the test steps can be easily determined. The running time in executing the test set or test module can be easily estimated as one knows the underlying complexity.

A mathematical notation useful for analyzing algorithms for efficiency is Big O notation. In computer science, it is useful for the analysis of the complexity of algorithms. It describes or represents the asymptotic behavior and efficiency of an algorithm or function. The complexity of the test cases, as derived from the number of independent paths, may be represented using Big O(n) notation. For example, the time (depending on the number of steps) taken to complete a problem of size n may be found. One may be concerned with how the running time of an algorithm increases with the size of the input in the limit, as the size of the input increases with bound.

According to Big O(n) notation, if $f(n)=O[g(n)]$, then O-notation gives the upper bound for a function within a constant factor. This means that it is less than some constant multiple of $g(n)$. Big O(n) is used to describe the asymptotic upper bound for the magnitude of a function in terms of another, usually simpler, function. The notation is read, "f of n is big oh of g of n". It is applied for the theoretical measure of the execution of an algorithm, usually the time or memory needed, given the problem size n, which is usually the number of items.

Considering n in Big O(n) as the total number of vertices in a flow graph, the number of independent paths which deals with the vertices, may be correlated with the Big O(n) representation to determine the running time of the algorithm, as given below:

The number of independent paths in a flow graph may be determined in one of the aforementioned ways. As the number of test steps in a test case increases, the number of vertices in the flow graph also increases and consequentially the number of independent paths in the flow graph increases. In general, as the number of vertices in the flow graph increases, the complexity of the test case represented by that flow graph also increases. So, correlating the same for the formula [E−N+2] =>Complexity=E−N+2=O(n), where [E−N+2] is assumed as $f(n)$, and O(n) is assumed as $O[g(n)]$, where $g(n)=n$ (in the above definition of Big O(n)).

Figure 5:
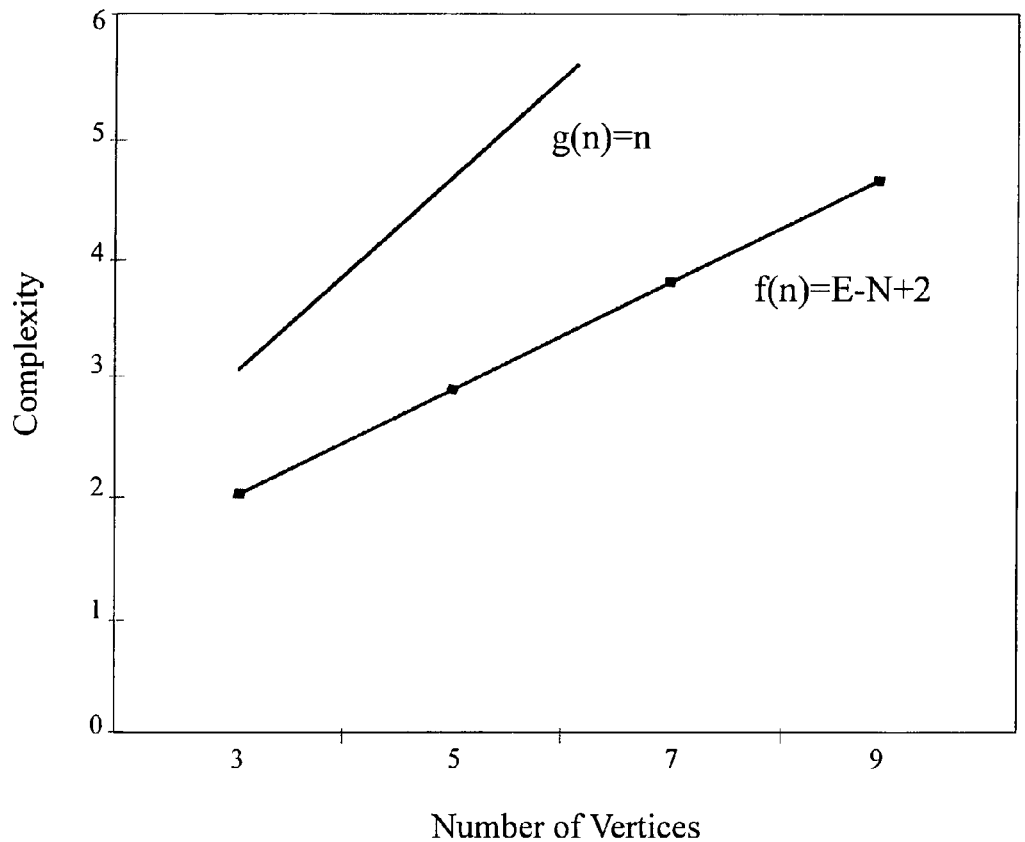
FIG. 5 shows a graphic representation of an embodiment of a plot between number of vertices in the flow graph and complexity.

For the exemplary flow graphs illustrated in FIGS. 1 to 4, for which the number of Independent paths has been derived, a plot between the number of vertices in the flow graph and complexity results in a graph as shown in FIG. 5. Both $f(n)$ and $g(n)$ have been represented in the graph of FIG. 5. From the graph, it can be seen that the complexity of a test case increases linearly with n, where n is the number of vertices.

In an embodiment, the invention provides for a better control for writing the test cases. Because one can control the complexity of a test case, test cases with less complexity may be executed with less complexity. Apart from having better management of the test cases, one can also reduce the duplication of tests if the test cases are represented in a flow graph. This helps in identifying the number of independent paths, and in each case one can ensure that the same step is not repeated in other test cases.

Given below are some examples of cases having defect(s), where duplication of defects and non-reproducible defects is avoided by using the techniques described herein.

In an embodiment, a scenario might be as follows:

1) Delete the Organizational Unit object in Active Directory. Organizational Unit is a container which consists of many objects inside that container. A defect has been reported, such as "restore of deleted OU object fails".

2) Delete the container object in Active Directory. An attempt to restore results in failure. Another defect is filed; e.g. "process of restore of deleted container object has failed".

In both the above mentioned exemplary cases, recursive restoration of objects does not work and this fails for both cases. To solve this problem, if both test cases are represented in flow graphs, the number of independent paths can be determined, and duplicate defect identification can be eliminated. The functionality of recursion can also be tested.

Another example is an incremental backup of an Active directory object when a level 1 backup is not working. In both the cases, basic incremental functionality does not working and two defects are triggered.

Another example is the rollover of a folder, rollover of a file and subdirectories that are failing. The actual error is that rollover of directories is not working, but there are two other defects found during testing.

A further example is the import of reparse point not functioning and the backup of directories with mount points is not working. In both cases, the actual error is that the backup of the mount point is not working, but different defects are found during testing.

Also, once the number of independent paths is found in the flow graph and the same is applied in the test cases, the steps to reproduce the problem are known, as testing will be basically traversing the identified paths.

There may be test cases where the number of test steps within each test case is greater than 15. Over the time period, if the developer asks for more information regarding the defect, it will be difficult for the tester to execute all the test steps involved in the test case to reproduce the defect as this increases the testing complexity. Also, the time taken by the tester to reproduce the defect increases as he has to spend more time executing each of the test steps. So, if there is a standard method for writing the test case, according to the present invention, and if the test case is standardized such that it cannot exceed a certain complexity, then the total number of test steps in the above exemplary test case can be split to form multiple test cases. Each test case would have less complexity than the larger more complex test. In this case, it becomes easy for the tester to reproduce the defect for a particular test case as the internal complexity is much less.

The method according to an embodiment can be implemented in any testing organization. This helps to write efficient test cases. The testers are motivated and guided to improve test quality and efficiency. The implementation is general. Normally test cases are in a test case database or on electronic spread sheets like Excel. In an embodiment, the test case database may be installed on a computer machine that runs a Test Director. Once the test cases are written on the test case database, the test cases may be executed on a computer machine having a Windows, Linux, or Solaris operating system, or any other suitable operating system. Corresponding software may be installed on the machine and test cases written for that product may be executed for testing of the software.

In an embodiment the computer system for ensuring quality of test cases for software testing may be equipped with a memory device to store executable code of an application program and the test cases, a processor coupled to the memory device to execute the codes, an input device and an output device.

In one embodiment the output device may be a display screen that displays the result of comparison of the complexity of test cases determined by the application program with a set benchmark for the test case complexity.

In another embodiment the test cases are executed only when the complexity of test cases as determined is equal to or less than the benchmark set for it.

In an embodiment, the method of the invention may be used in an automated tool that generates test cases. Auto generated test cases may also have test steps involved. Before generating the test steps using the tool, it may be generalized that a particular automation test case should not have more than a certain complexity. In that way, the size of the test cases that are written for automated testing can also be determined and managed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   (a) defining a benchmark complexity for a test case including at least one test step, wherein each test step in the test case includes a check condition and a functionality;
   (b) representing the test case as a flow graph, wherein:
      the check condition of the test step is represented as an edge of the flow graph and the functionality of the test step is represented as a vertex in the flow graph; and
      the functionality of each child test step in the test case is only permitted to be performed if the check condition of a parent test step is successful;
   (c) using a processor to determine a measure of complexity for the test case, including by determining a number of independent paths in the flow graph;
   (d) if the measure of complexity for the test case exceeds the benchmark complexity, using the processor to modify the test case, including by reducing the number of test steps in the test case; and
   (e) performing the modified test case with the reduced number of test steps only when the measure of complexity for the test case does not exceed the benchmark complexity.

2. The method of claim 1, further comprising repeating steps (b), (c), (d), if the test case complexity exceeds the benchmark complexity.

3. The method of claim 1, wherein the flow graph includes one or more of the following: a directed flow graph or a non-cyclic flow graph.

4. The method of claim 1, wherein the number of test steps in the test case is determined by one or more of the following: the number of predicate nodes in the flow graph or the number of pendent vertices in the flow graph.

5. The method of claim 1, wherein the number of independent paths is determined using one or more of the following:
   the formula $E-N+2$, where E is the number of edges and N is the number of pendent vertices in the flow graph;
   the mathematical relation $D=\max\{d(u, v)$ such that $u, v$ belongs to $V(G)\}$, where $d(u, v)$ is the least length of a path from u to v; $V(G)$ refers to the set of vertices in a flow graph, wherein the number of independent paths is defined by the diameter of the flow graph; or
   the maximum cardinality of an independent set, where maximum cardinality is the maximum size of the independent set of vertices, having no edge between any two vertices in the set.

6. The method of claim 1, wherein the number of test steps within the test case represents the size of the test case.

7. The method of claim 1, wherein duplication of defects in the test case is avoided.

8. The method of claim 1, wherein non-reproducibility of defects in the test case is avoided.

9. The method of claim 1, wherein the test case is written manually.

10. The method of claim 1, wherein the test case is generated at least in part by an automated tool.

11. The method of claim 10, wherein the tool is configured to perform one or more of the following: to limit the complexity of the test case to the benchmark or to determine programmatically the complexity of the test case.

12. The method of claim 1, wherein the test case includes one or more of the following test steps: a test step associated with mounting a file system, a test step associated with performing a backup, or a test step associated with recovering a backup.

13. The method of claim 1, wherein reducing the number of test steps in the test case includes dividing the test case into two or more test cases.

14. The method of claim 1 further comprising displaying, on a display screen, a result of a comparison between the measure of complexity and the benchmark complexity.

15. A computer program product, the computer program product being embodied in a tangible computer readable storage medium and comprising computer instructions for:
   (a) define a benchmark complexity for a test case including at least one test step, wherein each test step in the test case includes a check condition and a functionality;
   (b) representing the test case as a flow graph, wherein:
      the check condition of the test step is represented as an edge of the flow graph and the functionality of the test step is represented as a vertex in the flow graph; and
      the functionality of each child test step in the test case is only permitted to be performed if the check condition of a parent test step is successful;
   (c) determining a measure of complexity for the test case, including by determining a number of independent paths in the flow graph;
   (d) if the measure of complexity for the test case exceeds the benchmark complexity, modifying the test case, including by reducing the number of test steps in the test case; and
   (e) performing the modified test case with the reduced number of test steps only when the measure of complexity for the test case does not exceed the benchmark complexity.

16. The computer program product of claim 15, wherein the test case includes one or more of the following test steps: a test step associated with mounting a file system, a test step associated with performing a backup, or a test step associated with recovering a backup.

17. The computer program product of claim 15, wherein the computer instructions for reducing the number of test steps in the test case include computer instructions for dividing the test case into two or more test cases.

18. The computer program product of claim 15 further comprising computer instructions for displaying, on a display screen, a result of a comparison between the measure of complexity and the benchmark complexity.

19. A system, comprising:
   a storage; and
   a processor coupled to the storage and configured to:
      (a) define a benchmark complexity for a test case including at least one test step, wherein each test step in the test case includes a check condition and a functionality;
      (b) represent the test case as a flow graph, wherein:
         the check condition of the test step is represented as an edge of the flow graph and the functionality of the test step is represented as a vertex in the flow graph; and
         the functionality of each child test step in the test case is only permitted to be performed if the check condition of a parent test step is successful;
      (c) determine a measure of complexity for the test case, including by determining a number of independent paths in the flow graph;
      (d) if the measure of complexity for the test case exceeds the benchmark complexity, modify the test case, including by reducing the number of test steps in the test case; and
      (e) perform the modified test case with the reduced number of test steps only when the measure of complexity for the test case does not exceed the benchmark complexity.

20. The system of claim 19, wherein the test case includes one or more of the following test steps: a test step associated with mounting a file system, a test step associated with performing a backup, or a test step associated with recovering a backup.

21. The system of claim 19, wherein the processor is configured to reduce the number of test steps in the test case by dividing the test case into two or more test cases.

22. The system of claim 19, wherein the processor is further configured to display, on a display screen, a result of a comparison between the measure of complexity and the benchmark complexity.

* * * * *